US009731927B2

(12) United States Patent
Harter

(10) Patent No.: US 9,731,927 B2
(45) Date of Patent: Aug. 15, 2017

(54) CUT SHEET LENGTH CONTROL IN A CORRUGATOR DRY END

(75) Inventor: Richard W. Harter, Park Falls, WI (US)

(73) Assignee: Marquip, LLC, Phillips, WI (US)

( * ) Notice: Subject to any disclaimer, the term of this patent is extended or adjusted under 35 U.S.C. 154(b) by 1099 days.

(21) Appl. No.: 13/585,581

(22) Filed: Aug. 14, 2012

(65) Prior Publication Data

US 2014/0048640 A1 Feb. 20, 2014

(51) Int. Cl.

*B65G 35/00* (2006.01)
*B65H 35/08* (2006.01)
*B26D 7/06* (2006.01)

(52) U.S. Cl.

CPC ............... *B65H 35/08* (2013.01); *B26D 7/06* (2013.01); *B65H 2515/31* (2013.01); *B65H 2701/1762* (2013.01); *Y10T 83/2192* (2015.04); *Y10T 83/6491* (2015.04)

(58) Field of Classification Search

CPC .... B65H 23/1888; B65H 35/00; B65H 35/02; B65H 35/04; B65H 35/08; B65H 35/0073; B65H 2515/51; B65H 2701/1762; B65H 2701/17623
USPC ..... 83/110, 236, 298, 312; 226/24, 4, 42, 44
See application file for complete search history.

(56) References Cited

U.S. PATENT DOCUMENTS 3,639,053 A * 2/1972 Spear, Jr. ................. B26D 5/20 399/385
4,289,052 A * 9/1981 Woolston ................. B26D 7/32 271/182
4,809,573 A 3/1989 Welch
4,919,027 A 4/1990 Littleton
4,972,743 A * 11/1990 Nojima .................. B65H 35/06 83/156
5,695,105 A 12/1997 Ohara
5,713,256 A * 2/1998 Keeny .................... B65H 35/08 83/110
5,768,959 A * 6/1998 Lorenzo ................... B26D 5/20 226/111
5,857,392 A 1/1999 Parkander
5,857,395 A * 1/1999 Bohm .................. B23D 35/008 493/227
5,899,128 A 5/1999 Smithe et al.
6,073,527 A * 6/2000 Harter ................ B65H 29/6609 83/110
6,389,941 B1 * 5/2002 Michler ................... B26D 7/08 101/216
7,117,776 B1 10/2006 Grafe et al.
8,100,038 B2 1/2012 Sandahl
2004/0114020 A1 * 6/2004 Widmer ................... B65H 5/34 347/104
2006/0132584 A1 * 6/2006 Jobmann ................ B26D 1/626 347/219

* cited by examiner

*Primary Examiner* — Kenneth E. Peterson
*Assistant Examiner* — Samuel A Davies
(74) *Attorney, Agent, or Firm* — Andrus Intellectual Property Law, LLP

(57) ABSTRACT

Tension spikes in a running web slit to direct output webs to respective upper and lower cutoff knives are minimized by anticipating the increased tension in the web when the lead edge enters an outfeed nip and offsetting the tension spike with a decrease in the force imposed by the infeed pull roll nip, whereby the sum of the web tensions is substantially uniform through the cutting cycle and the sheets are cut to a consistent length.

16 Claims, 6 Drawing Sheets

CUT SHEET LENGTH CONTROL IN A CORRUGATOR DRY END

BACKGROUND

The present disclosure is directed to improving cut length accuracy in the cutoff knife of a corrugator dry end where the incoming output webs or "outs" may be subject to web tension change pulses that affect sheet length.

In the dry end conversion of a corrugated paperboard web, the continuously running web which has been slit along its length, is pulled into and through a rotary cutoff knife, typically having upper and lower knife levels, the web being cut crosswise into sheets of selected lengths. Such sheets are conveyed into a downstream stacker where stacks of sheets are formed and transferred away for further processing. In a typical corrugator dry end, the cutoff knife comprises a pair of counter rotating cylinders carrying helical cutting blades. A variable speed drive controls cutoff knife speed to cut sheets of widely varying lengths from the running web at both knife levels.

In such a system, the web upstream of the slit line is joined such that the output webs move together, each output web utilizing a separate driven infeed pull roll nip that imposes a first force on the output web and directs the output web into the cutoff knife. A driven outfeed or exit nip downstream of the cutoff knife engages the lead edge of the output web and imposes a second force on the output web to control the sheets after they are cut and to pull a gap between each cut sheet and the leading edge of the output web moving through the knife. The output web is thus pulled by the sum of the first and second forces until the sheet is cut. However, the output web is pulled only by the first force until the lead edge of the output web reaches the outfeed nip.

SUMMARY

In accordance with one aspect of the subject disclosure, a method for controlling cut sheet length changes that result from changes in tension in the web and in the output webs through a cutting cycle in which the respective output webs are cut to different lengths is described. The method of controlling cut sheet lengths comprises the steps of (1) maintaining the first force at a high level as the output web travels through the pull roll nip and the cutoff knife, (2) adjusting the first force to a lower level when the leading edge of the output web at one knife level reaches the outfeed nip, and (3) operating the cutoff knife to cut the sheet and simultaneously adjusting the first force to the high level, whereby the tension on the output web is more uniform throughout the sheet cutting cycle than it would have been had the first force on the output web not been adjusted to the lower level when the leading edge of the output web reached the outfeed nip, such that the sheets are cut to a consistent length.

The method includes the further step of operating the infeed pull roll drive in a torque limit mode at a slight overspeed limited by torque to run at web speed. The method may also include the step of controlling the infeed pull roll drive torque to provide the lower and higher levels of the first force.

The sheet length control method may also include the step of providing the driven infeed pull roll nip with a counter rotating hold-down idler roll. The method also preferably includes the step of providing the driven outfeed nip with a driven nip roll or a driven conveyor belt. One embodiment includes the step of providing the driven outfeed nip with a counter rotating hold-down idler roll. Alternately, the method may include the step of providing the driven conveyor belt with a vacuum sheet hold-down apparatus.

In a variation of the above described method, a method for reducing sheet length variations in output webs as a result of changes in tension in the output webs during a sheet cutting cycle and for providing sheets cut to a consistent length is described. The method comprises the steps of (1) utilizing a torque control drive for the infeed pull roll to provide a high level of first force, (2) utilizing an infeed pull roll torque command to step down the torque to provide a lower level of first force and utilizing a signal from the web length measuring device to determine when the leading edge of the output web at one knife level reaches the outfeed nip, and (3) using a cutoff knife position signal to indicate completion of the cut and to step up the pull roll torque to provide the high level of the first force.

The method also preferably includes the step of utilizing a web length measuring device upstream of the slit line to provide a sheet length signal to the cutoff knife. When the respective output webs are cut to different lengths the system includes the step of utilizing the length measuring device to provide sheet length signals to both knife levels. The web length measuring device preferably comprises a resolver.

In one embodiment of the disclosure, a method for minimizing sheet length variations comprises the steps of (1) maintaining the first force in the output webs to both knife levels as the output webs travel through their respective infeed pull roll nip and the cutoff knife, (2) adjusting the first force to a lower level when the leading edge of the output web at one knife level reaches the outfeed nip and applying the lower level of first force to the output webs, and (3) operating the cutoff knife to cut the sheet and adjusting the first force to a higher level, whereby the tension on the output webs is more uniform throughout the sheet cutting cycle than it would have been had the first force on the output web not been adjusted to the lower level when the leading edge of the output web reached the outfeed nip, such that and the sheets are cut to a consistent length.

In applying the foregoing method, the upper level output web is preferably wider than the lower level output web.

DETAILED DESCRIPTION OF THE PREFERRED EMBODIMENT

Figure 2:
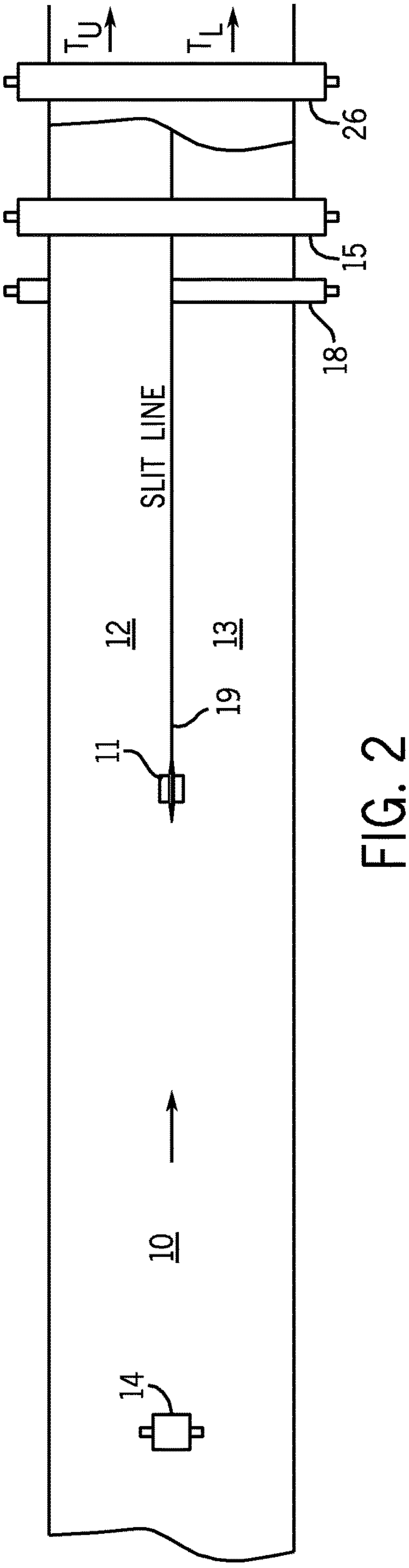
FIG. 2 is a schematic top plan view of the FIG. 1 knife assembly.
Figure 1:
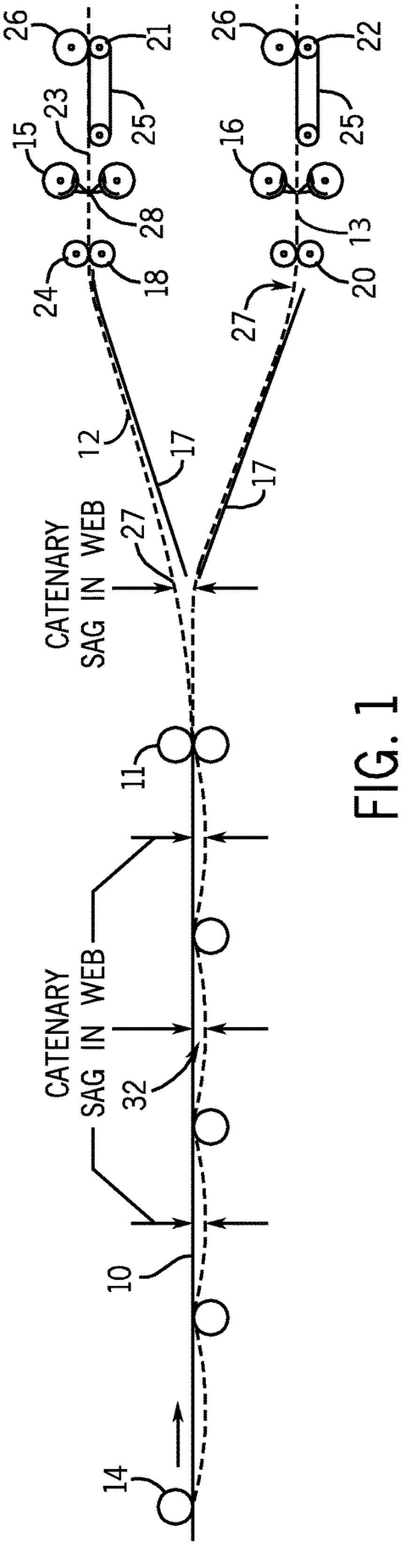
FIG. 1 is a schematic side elevation view of a corrugator two-level cutoff knife assembly.

FIGS. 1 and 2 show schematically the cutoff knife assemblies operating on a two-level knife arrangement. The running web 10 is pulled through a rotary slitter 11 which divides the web into an upper level output web 12 (or "out") and a lower level output web 13 (or "out"). Typically and for reasons not relevant to the present disclosure, the upper level output web 12 is wider than the lower level output web 13. In addition, each of the outs may be separately slit further to provide multiple outs (not shown for simplicity). It is important to note, however, that upstream of the web slitter 11, the entire web 10 is unslit such that movement of both output webs 12 and 13 occurs together. Further, a web measuring wheel or resolver 14 provides a continuous measurement of the running web and provides signals to the upper level cutoff knife 15 and the lower level cutoff knife 16 to control cut sheet lengths.

As the output webs 12 and 13 exit the slitter 11, each of the output webs is directed onto a set of web divert forks 17 that separate and carry the output webs 12 and 13 to the respective cutoff knives 15 and 16. An upper level pull roll 18 moves the upper output web 12 into and through the upper cutoff knife 15 and, similarly, a lower level pull roll 20 moves the lower level output web 13 through the lower level cutoff knife 16.

Upper and lower level exit nips 21 and 22, respectively, capture the leading edges of the output webs to assist in pulling the output webs 12 and 13 through the knives 15, 16 and, after the cutoff knives 15 and 16 have cut the webs, the respective exit nips 21 and 22 maintain control of the cut sheets and direct them into a downstream stacking system. To facilitate stacking, the exit nips 21 and 22 are driven at a slight overspeed with respect to the output webs 12 and 13 so that a gap is pulled between cut sheets so that they can be shingled prior to stacking.

Figure 3:
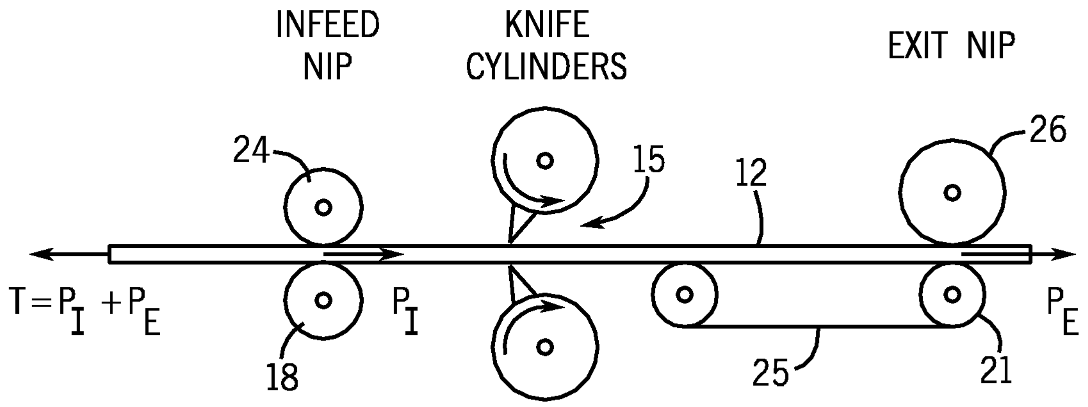
FIG. 3 is an enlarged side elevation of the cutoff knife arrangement of FIG. 1.
Figure 4:
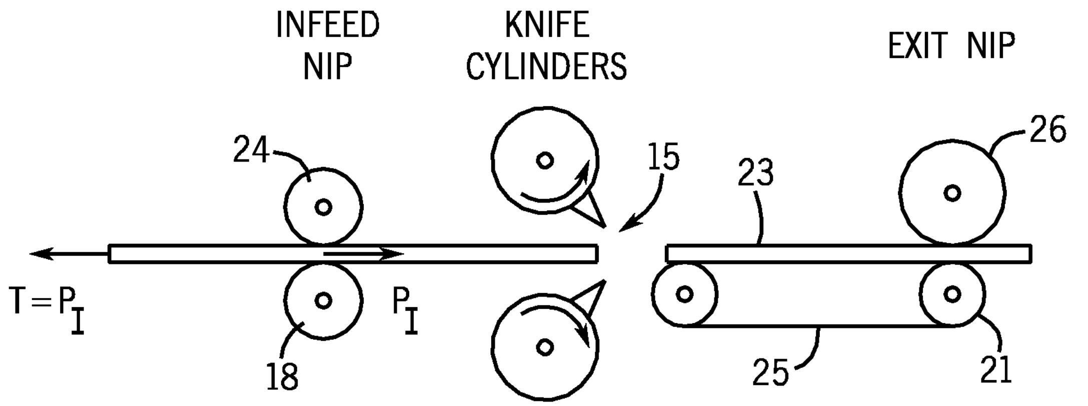
FIG. 4 is an enlarged side elevation similar to FIG. 3, but showing the cutoff knife positioned immediately after a sheet is cut.

Referring also to FIGS. 3 and 4, these views show the variation in output web tension before and after a sheet 23 is cut. Only one level will be described, the other being essentially the same. A driven upper level pull roll 18 cooperates with an upper idler nip roll 24 to pull the web 12 into and through the upper cutoff knife 15. On the downstream knife exit, the upper level exit nip 21 includes a driven conveyor 25 and a counterrotating nip roll 26. Other arrangements for the exit nip 21 may also be used, including applying vacuum to the conveyor 25. The exit nip could alternately consist of rolls in a manner similar to the infeed nip.

Figure 5A:
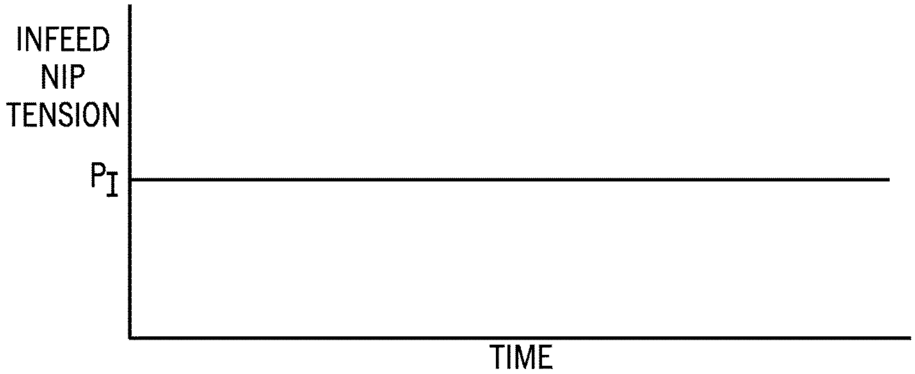
FIG. 5a (PRIOR ART)
FIGS. 5*a*, 5*b* and 5*c* show schematically web tension changes in a prior art cutoff knife resulting from operation of the cutoff knife.
Figure 5B:
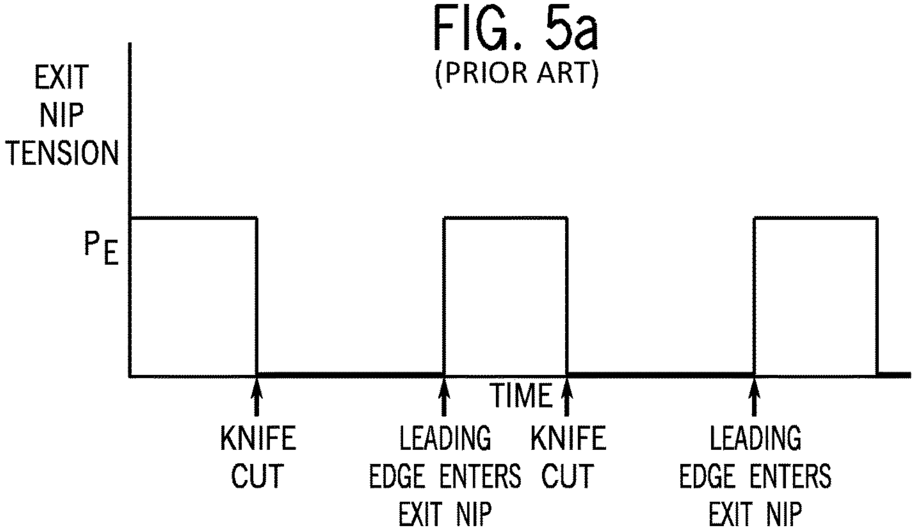
FIG. 5b (PRIOR ART)
Figure 5C:
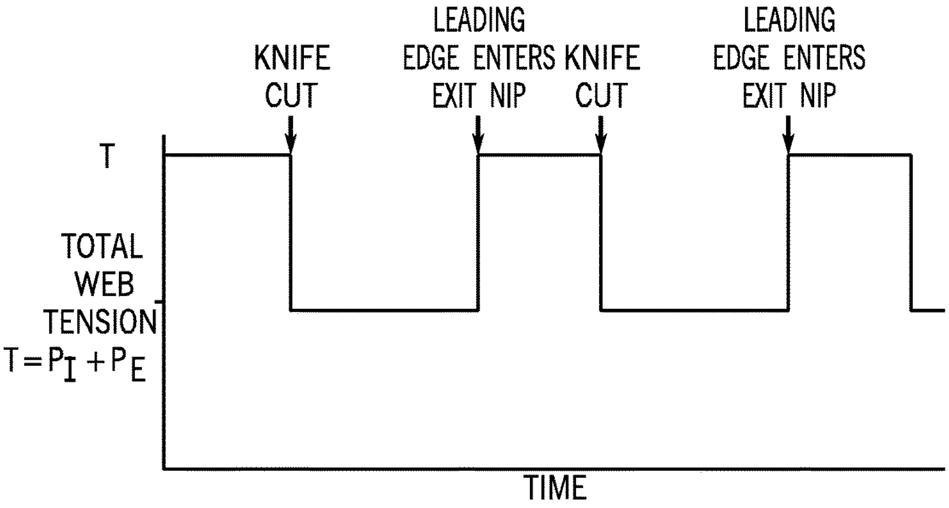
FIG. 5c (PRIOR ART)

As shown in FIG. 3, before the output web 12 is cut to provide a sheet 23, total web tension (T) comprises the sum of the pulling force provided by the pull roll 18 ($P_I$) and the pulling force provided by the exit nip 21 ($P_E$). When the sheet 23 is cut, as shown in FIG. 4, the tension in the web is simultaneously dropped to the level of the first force ($P_I$) generated by the pull roll 18. FIGS. 5*a*-5*c* show schematically how current prior art cutoff knives respond to the changes in web tension before and after the knife cut is made. In FIG. 5*a*, force ($P_1$) provided by the infeed pull roll 18 remains constant during the cyclic cutting of sheets 23. The exit nip force ($P_E$) varies with each cutting knife cycle from 0 when the cut is made until the leading edge of the following output web enters the exit nip 21, resulting in an immediate rise in web tension to its maximum level. This is shown in FIG. 5*b*. When the infeed nip force ($P_I$) is summed with the exit nip force ($P_E$), the result is shown in FIG. 5*c* where each knife cycle includes a sharp drop in total web tension (T) with the knife cut and a corresponding rise in tension when the leading edge of the web enters the exit nip 21. This results in web pulses between the high and low total web tensions ($P_I$)+($P_E$) and ($P_I$). Ordinarily, these web pulses would repeat identically and, as a result, would not affect consistent cut sheet length. However, as will be discussed below, because the output webs 12 and 13 are joined upstream of the slitter 11 and slit line 19 (FIG. 2), any tension disturbance or other pulsation caused by one level of the cutoff knife is seen in the other knife level and will influence cut sheet length accuracy.

Figure 6A:
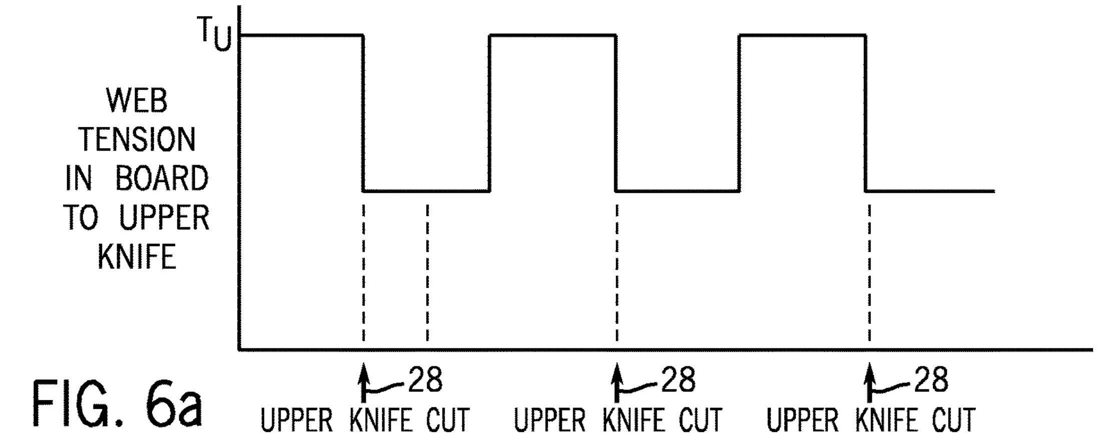
FIG. 6*a* is a schematic depiction similar to FIG. 5*c* of web tension in sheet cutting cycles in accordance with the prior art.
Figure 6B:
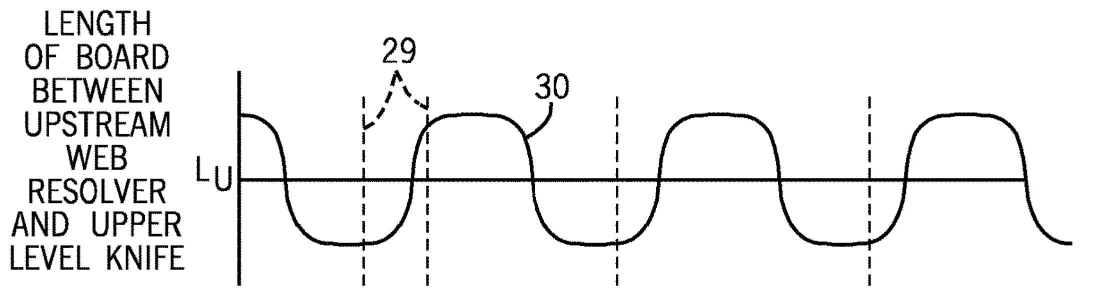
FIG. 6*b* is a schematic depiction showing variations in web length between the upstream web measuring wheel and the upper cutoff knife resulting from the cyclic variation in web tension in the FIG. 6*a* operation of the cutoff knife.
Figure 6C:
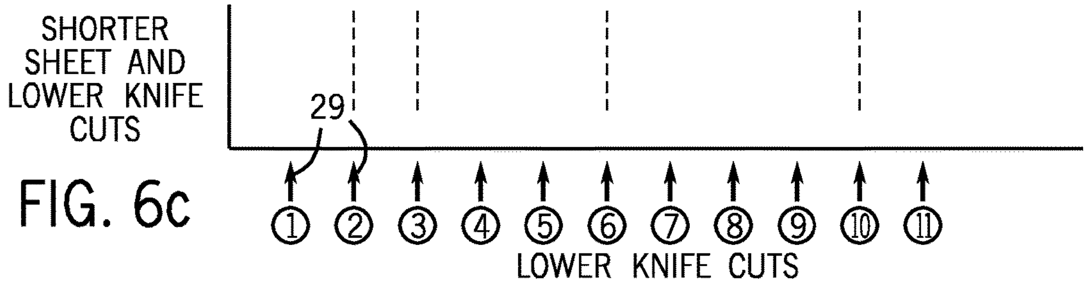
FIG. 6*c* shows lower level knife cuts that provide sheets shorter in length than the upper level sheets.

Referring again to FIG. 1, the upper level output web 12 is subject to catenary sag 27 between the upstream ends of the web divert forks 17 and the upper level pull roll 18. Catenary sag typically occurs because the output webs 12 and 13 are not supported fully between the slitter 11 and pull rolls 18 and 20. In addition, there is also some catenary sag 32 in the web between the resolver 14 and the slitter 11 because the web 10 is also not fully supported through that portion of the run and, in addition, inherent elasticity in the web also induces web length variations. Variations in catenary sag 27 downstream of the slitter 11 are transmitted to and combined with the catenary sag 32 upstream of the slit 19 allowing the resultant pulses to be transferred to the lower knife level. The variations in total web tension, as shown in FIG. 5*c*, induce changes in the catenary sag of the output web in both the upper and lower levels 12 and 13, as well as in the catenary sag 32 in the web upstream of the slit 19. As the catenary sag 27 moves between a minimum and a maximum, the length of the web between the upstream resolver 14 and the upper level cutoff knife 15 will correspondingly change from a minimum to a maximum length. This is significant because cut sheet length is determined by a signal generated by the resolver 14 that directs the cutoff knife 15 to make the programmed cuts. As mentioned above, the variations in web length between the upstream resolver 14 and the upper level cutoff knife 15 does not in itself affect cut length consistency because, as shown in FIG. 6*b*, the upper level knife cuts 28 are always made at the same lengthwise position. However, as also mentioned above, the tension pulses are directed from the upper level knife 15, via the unslit web, to the lower level where typically sheets of a different length are being cut. Because the lower level knife cuts 29 (FIG. 6*c*) are not made with the catenary length always at the same knife cut position, cut sheets will vary in length. The length variations can be significant enough to produce unacceptable sheets. For example, in accordance with one sheet length specification, 99% of sheets must be within 0.040 inch of the desired length. FIG. 6*a* shows how the upper web tension $T_U$ affects the web length $L_U$ in FIG. 6*b* between the resolver wheel 14 and both the upper level knife 15 and the lower level knife 16. FIG. 6*c* shows lower level knife cuts providing sheets that are one-fourth the length of the upper level sheets. When these lower level cuts are superimposed on the sine wave-like curve 30, variations occur in the upper level web length between the upstream resolver 14 and the upper level cutoff knife 15. If the first two lower knife cuts, numbered 1 and 2, intercept the web at the bottom of the sine wave length curve 30 where web length is a minimum, the following two lower level knife cuts, numbered 3 and 4, will intercept the curve 30 at its upper level position where the web tension is less and the length of web between the upstream resolver 14 and the upper level cutoff knife 15 is at its maximum. The large difference between cuts number 2 and 3, for example, results in a significant variation in the cut length of the lower level sheets.

Figure 6D:
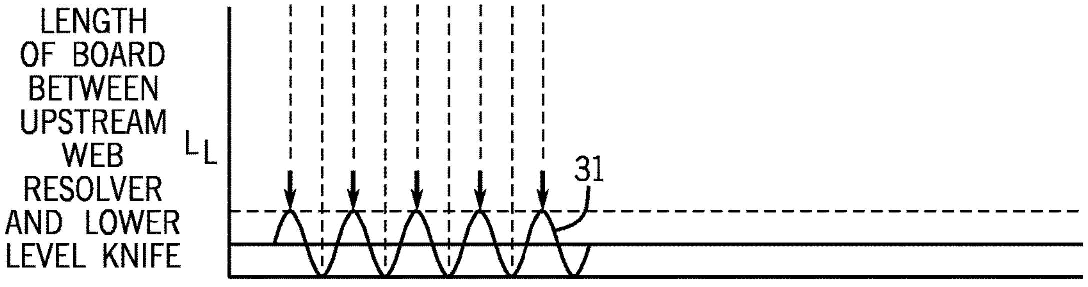
FIG. 6*d* is a schematic depiction showing variations in web length between the upstream web measuring wheel and the lower cutoff knife resulting from the cyclic variation in web tension in the FIG. 6*c* operation of the lower cutoff knife.

Although the potential sheet length variations caused by the variations in web catenary length are significant, there are also web pulsations created by cuts at the lower level cutoff knife 16 that are imposed on the upper level web 12 in a manner similar to the pulsations generated in the upper level output web, but typically at a higher frequency (shorter sheets) and a lower amplitude (narrower web providing lower pull tension) as shown in FIG. 6*d*. Compare for example, the upper level sine wave curve 30 of FIG. 6*b* with the lower level sine wave curve 31 of FIG. 6*d*.

Figure 7A:
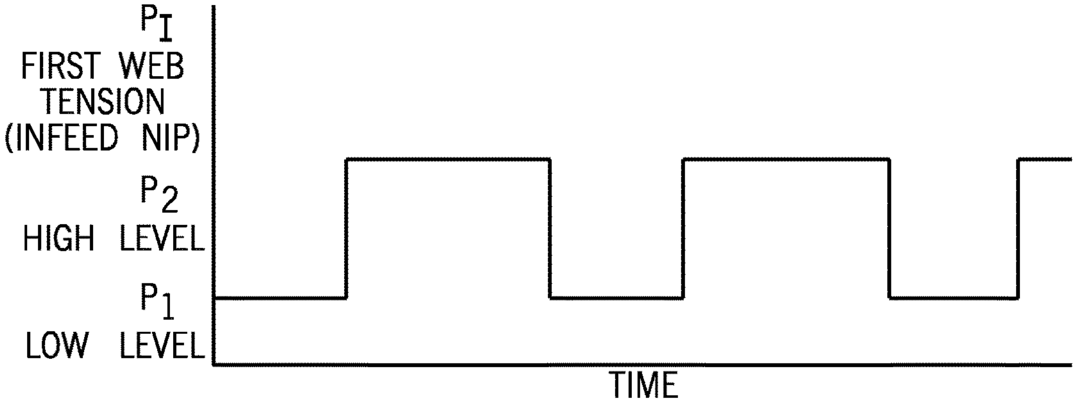
FIG. 7*a* shows schematically how web tension in the infeed nip in accordance with the present disclosure is controlled to minimize variations in cut sheet length.
Figure 7B:
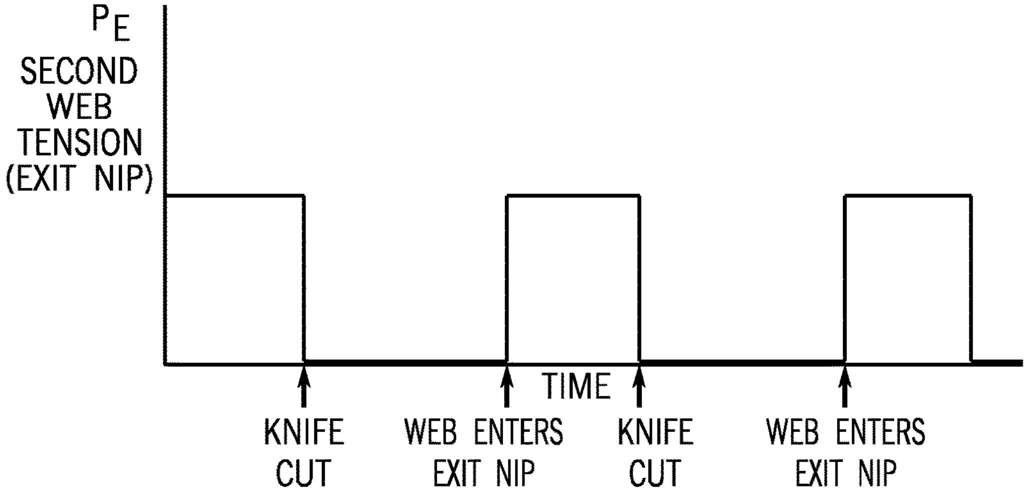
FIG. 7*b* shows schematically how web tension through the exit nips varies in the same way as shown in FIG. 5*b*.
Figure 7C:
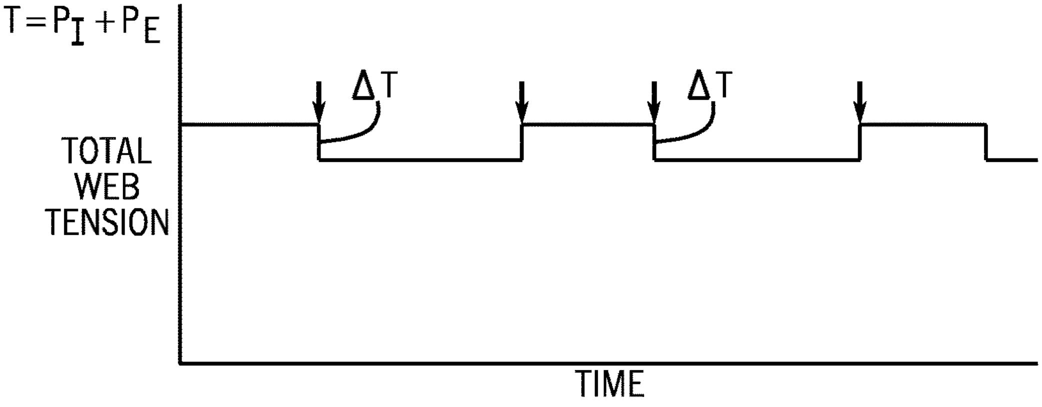
FIG. 7*c* shows schematically how variations in total web tension are minimized when the infeed nip and exit nip forces are combined in accordance with the present disclosure.

Referring now to FIGS. 7*a*-7*c*, the present disclosure provides a pull roll tension control that minimizes the effects of web tension pulsations and that results in consistent sheet lengths. Web tension control in accordance with the present disclosure preferably utilizes an infeed pull roll drive operating in a torque control mode. The control reduces the amplitude of web tension spikes that result from the added web tension imposed by output web entry into the upper level exit nip 21.

The infeed nip drive torque operates to maintain the first force $P_I$ at the higher level $P_2$ as the upper level output web 12 travels through the pull roll nip 18 and the upper level cutoff knife 15. When the leading edge of the web 12 reaches the upper level exit nip 21, first force is adjusted to a lower level $P_1$, as shown in FIG. 7*a*. When the cutoff knife 15 is operated to cut the sheet, exit roll force $P_E$ drops to 0 (FIG. 7*b*) and the first force is adjusted back to the initial higher level $P_2$. As a result, the sum of the first and second forces results in web tension that is substantially uniform and the sheets are cut to a consistent length. This is shown graphically in FIG. 7*c*, which shows the result or sum of the force variations in the upper level pull roll 18 and the upper level exit nip 21. This is reflected in the relatively small differences in total web tension $\Delta T$ in FIG. 7*c*. The direct result is that the total difference in catenary sag and thus in the length of the web between the resolver 14 and the cutoff knife 15 in successive knife cuts is minimized at both levels of the knife, but in particular at the lower knife level where sheets are typically narrower and the influence of the opposite upper level wider output web is greater.

Figure 8A:
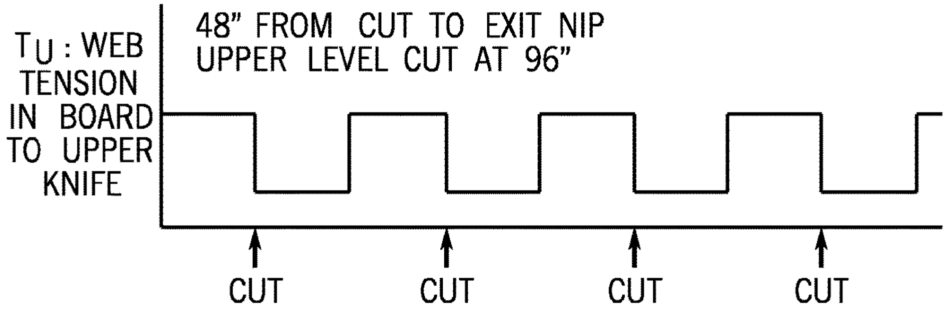
FIGS. 8*a*-8*e* show the relationships in prior art systems between web tension and sheet cut length at both knife levels.
Figure 8B:
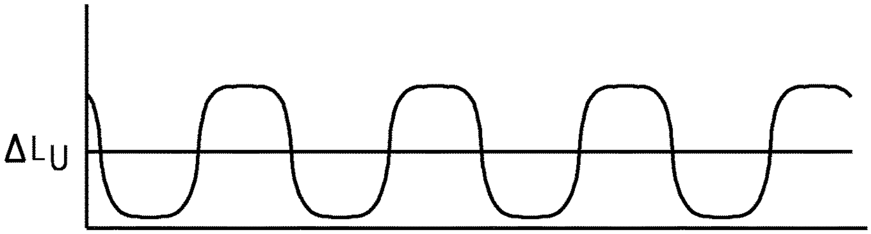
Figure 8C:
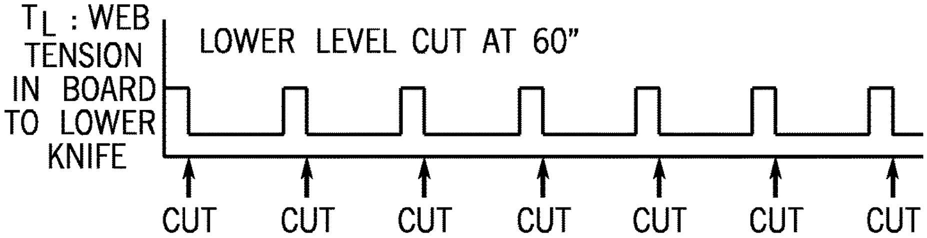
Figure 8D:
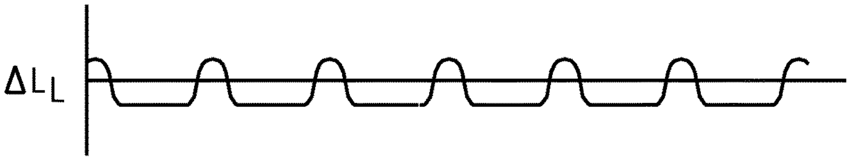
Figure 8E:
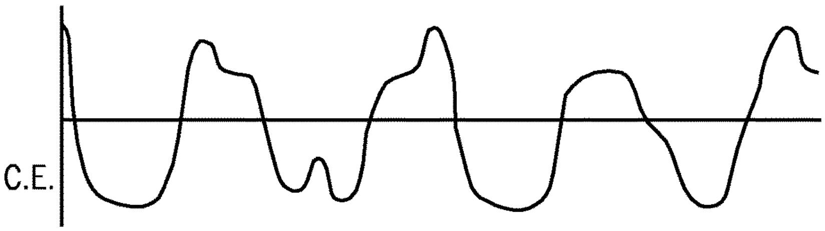

In FIGS. 8*a*-8*e*, there is a more comprehensive schematic showing the effects of web tension at both knife levels and the resultant effect on web length between the upstream web resolver 14 and the upper and lower level cutoff knives 15 and 16, respectively. This schematic assumes upper level sheet lengths of 96 inches and a 48 inch distance from the upper level cutoff knife 15 to the upper level exit nip 21. FIG. 8*b* is similar to FIG. 6*b* and shows the variation in web length ($\Delta L_U$) between the web resolver wheel 14 and the upper level knife 15 due to the upper knife pull roll and exit roll forces. FIGS. 8*c* and 8*d* assume a lower level sheet cut length of 60 inches, shown schematically in FIG. 8*c* where the tension variations in the output web to the lower knife 16 are of greater frequency and lower amplitude than the tension variations in the upper level as shown in FIG. 8*a*. FIG. 8*d* shows the effect of variations in the length ($\Delta L_L$) of the web between the resolver wheel 14 and the lower level cutoff knife 16 due to the lower knife pull roll and exit roll forces. FIG. 8*e* shows the cumulative effect, noted as C.E. of the forces imposed by the upper and lower pull rolls 18, 20 and exit rolls 21, 22 on the web length between the web wheel resolver 14 and the respective knives 15, 16.

The foregoing figures show that the higher web tensions and resultant higher catenary length variations at the upper level, when imposed on the lower level, are of a substantially greater amplitude, and the smaller variations in catenary length at the lower level shown in FIG. 8*d* are of substantially lower amplitude. Nevertheless, by applying the upper level tension control strategy to the lower level, the additive effect is also minimized.

What is claimed is:

1. In a system for cutting sheets from a running unslit web that is subsequently slit along its length into upper and lower output webs divided by a slit line and directed to respective upper and lower knife assemblies, the unslit web upstream of the slit line joining the upper and lower output webs to move together, each of the upper and lower knife assemblies utilizing a separate driven infeed pull roll nip imposing an infeed nip force on the respective upper or lower output web and directing the respective upper or lower output web into a separate driven cutoff knife for cutting the sheets, and each of the upper and lower knife assemblies utilizing a separate driven outfeed nip downstream of the cutoff knife, the outfeed nip engaging a leading edge of the respective upper or lower output web and imposing an outfeed nip force on the respective upper or lower output web to control the sheets after they are cut and to pull a gap between each cut sheet and the leading edge of the respective upper or lower output web moving through the cutoff knife, the respective upper or lower output web being subjected to a sum of the infeed and outfeed nip forces until a given sheet is cut, the respective upper or lower output web being subjected only to the infeed nip force until the leading edge of the respective upper or lower output web reaches the outfeed nip, an improvement comprising:

a method for controlling cut sheet length changes resulting from changes in tension in the unslit web and in the upper and lower output webs through a sheet cutting cycle in which the respective upper and lower output webs are cut to different lengths, the method comprising the steps of:

(1) maintaining a high level of infeed nip force on one of the upper and lower output webs as the one of the upper and lower output webs travels through its respective infeed pull roll nip and its respective cutoff knife;

(2) adjusting the infeed nip force on the one of the upper and lower output webs to a lower level in response to the leading edge of the respective one of the upper and lower output webs reaching its respective outfeed nip; and (3) operating the respective cutoff knife to cut the given sheet and adjusting the infeed nip force on the one of the upper and lower output webs to the high level in response to a cutoff knife position signal;

whereby a total tension in the respective one of the upper and lower output webs upstream of its respective infeed pull roll nip is more uniform throughout the sheet cutting cycle than it would have been had the infeed nip force on the respective one of the upper and lower output webs not been adjusted to the lower level when the leading edge of the respective one of the upper and lower output webs reached its respective outfeed nip, such that each of the sheets is cut to a consistent length.

2. The method as set forth in claim 1, including the step of operating the infeed pull roll nip associated with the one of the upper and lower output webs in a torque limit mode at a small overspeed limited by torque to run at web speed.

3. The method as set forth in claim 2, including the step of controlling a drive torque of the infeed pull roll nip associated with the one of the upper and lower output webs to provide the high and lower levels of infeed nip force on the one of the upper and lower output webs.

4. The method as set forth in claim 1, including the step of providing the infeed pull roll nip associated with the one of the upper and lower output webs with a counterrotating hold-down idler roll.

5. The method as set forth in claim 1, including the step of providing the outfeed nip associated with the one of the upper and lower output webs with a driven nip roll or a driven conveyor belt.

6. The method as set forth in claim 5, including the step of providing the outfeed nip associated with the one of the upper and lower output webs with a counterrotating hold-down idler roll.

7. The method as set forth in claim 5, including the step of providing the driven conveyor belt with a vacuum sheet hold-down apparatus.

8. In a system for cutting sheets from a running unslit web that is subsequently slit along its length into upper and lower output webs divided by a slit line and directed to respective upper and lower knife assemblies, the unslit web upstream of the slit line joining the upper and lower output webs to move together, each of the upper and lower knife assemblies utilizing a separate driven infeed pull roll nip imposing an infeed nip force on the respective upper or lower output web and directing the respective upper or lower output web into a separate driven cutoff knife for cutting the sheets, and each of the upper and lower knife assemblies utilizing a separate driven outfeed nip downstream of the cutoff knife, the outfeed nip engaging a leading edge of the respective upper or lower output web and imposing an outfeed nip force on the respective upper or lower output web to control the sheets after they are cut and to pull a gap between each cut sheet and the leading edge of the respective upper or lower output web moving through the cutoff knife, the respective upper or lower output web being subjected to a sum of the infeed and outfeed nip forces until the sheet is cut, the respective upper or lower output web being subjected only to the infeed nip force until the leading edge of the respective upper or lower output web reaches the outfeed nip, an improvement comprising:

a method for controlling cut sheet length changes resulting from changes in tension in the unslit web and in the upper and lower output webs through a sheet cutting cycle in which the respective upper and lower outputs webs are cut to different lengths, the method comprising the steps of:

(1) utilizing a torque controlled drive for the infeed pull roll nip to provide a high level of infeed nip force on one of the upper and lower output webs as the one of the upper and lower output webs travels through its respective infeed pull roll nip and its respective cutoff knife;

(2) utilizing an infeed pull roll torque command to step down an infeed pull roll torque to provide a lower level of infeed nip force and utilizing a signal from a web length measuring device to determine when the leading edge of the respective one of the upper and lower output webs reaches its respective outfeed nip; and (3) using a cutoff knife position signal to indicate completion of a cut and to step up the infeed pull roll torque to provide the high level of infeed nip force on the one of the upper and lower output webs;

whereby a total tension in the respective one of the upper and lower output webs upstream of its respective infeed pull roll nip is more uniform throughout the sheet cutting cycle than it would have been had the infeed nip force on the respective one of the upper and lower output webs not been adjusted to the lower level when the leading edge of the respective one of the upper and lower output webs reached its respective outfeed nip, such that each of the sheets is cut to a consistent length.

9. The method as set forth in claim 8, including the step of utilizing the web length measuring device upstream of the slit line to provide a sheet length signal to the cutoff knife associated with the one of the upper and lower output webs.

10. The method as set forth in claim 9, wherein the upper and lower output webs are cut to different lengths and including the step of utilizing the web length measuring device to provide sheet length signals to the cutoff knives associated with both of the upper and lower output webs.

11. The method as set forth in claim 10, wherein the web length measuring device comprises a resolver.

12. In a system for cutting sheets from a running unslit web that is subsequently slit along its length into upper and lower output webs divided by a slit line and directed to respective upper and lower knife levels, the unslit web upstream of the slit line joining the upper and lower output webs to move together, each of the upper and lower knife levels utilizing a separate driven infeed pull roll nip imposing an infeed nip force on the respective upper or lower output web and directing the respective upper or lower output web into a separate driven cutoff knife for cutting the sheets, and each of the upper and lower output webs utilizing a separate driven outfeed nip downstream of the cutoff knife, the outfeed nip engaging a leading edge of the respective upper or lower output web and imposing an outfeed nip force on the respective upper or lower output web to control the sheets after they are cut and to pull a gap between each cut sheet and the leading edge of the respective upper or lower output web moving through the cutoff knife, the respective upper or lower output web being subjected to a sum of the infeed and outfeed nip forces until a given sheet is cut, the respective upper or lower output web being subjected only to the infeed nip force until the leading edge of the respective upper or lower output web reaches the outfeed nip, an improvement comprising:

a method for controlling cut sheet length changes resulting from changes in tension in the upper and lower output webs through a sheet cutting cycle in which the respective upper and lower output webs are cut to provide sheets of different lengths, the method comprising the steps of:

(1) maintaining a higher level of infeed nip force on both the upper and lower output webs as the upper and lower output webs travel through their respective infeed pull roll nips and their respective cutoff knives;

(2) adjusting the infeed nip force on the upper output web to a lower level of infeed nip force in response to the leading edge of the upper output web reaching its respective outfeed nip;

(3) operating the cutoff knife associated with the upper output web to cut a sheet and adjusting the infeed nip force on the upper output web to the higher level in response to an upper cutoff knife position signal;

(4) adjusting the infeed nip force on the lower output web to the lower level of infeed nip force in response to the leading edge of the lower output web reaching its respective outfeed nip; and (5) operating the cutoff knife associated with the lower output web to cut a sheet and adjusting the infeed nip force on the lower output web to the higher level in response to a lower cutoff knife position signal;

whereby respective total tensions in the upper and lower output webs upstream of their respective infeed pull roll nips are more uniform throughout the sheet cutting cycles than the tensions would have been had the infeed nip forces on the respective upper and lower output webs not been adjusted to the lower level when the leading edges of the respective upper and lower output webs reached their respective outfeed nips, such that each of the sheets is cut to a consistent length.

13. The method as set forth in claim 12, wherein the upper output web is wider than the lower output web.

14. The method as set forth in claim 13, wherein a cut sheet length of sheets cut at the upper knife level is greater than a cut sheet length of sheets cut at the lower knife level.

15. The method as set forth in claim 12, wherein the lower level of infeed nip force on the upper output web is different than the lower level of infeed nip force on the lower output web.

16. The method as set forth in claim 12, wherein the higher level of infeed nip force on the upper output web is different than the higher level of infeed nip force on the lower output web.

* * * * *